(12) United States Patent
Takeda et al.

(10) Patent No.: US 11,304,199 B2
(45) Date of Patent: Apr. 12, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 198 days.

(21) Appl. No.: 16/622,678

(22) PCT Filed: Jun. 15, 2017

(86) PCT No.: PCT/JP2017/022108
§ 371 (c)(1),
(2) Date: Dec. 13, 2019

(87) PCT Pub. No.: WO2018/229928
PCT Pub. Date: Dec. 20, 2018

(65) Prior Publication Data
US 2021/0144714 A1    May 13, 2021

(51) Int. Cl.
*H04W 72/04* (2009.01)
*H04W 24/08* (2009.01)

(52) U.S. Cl.
CPC ....... *H04W 72/0493* (2013.01); *H04W 24/08* (2013.01); *H04W 72/042* (2013.01); *H04W 72/0446* (2013.01); *H04W 72/0453* (2013.01)

(58) Field of Classification Search
CPC ........... H04W 72/0493; H04W 72/042; H04W 72/0446; H04W 72/0453; H04W 24/08
See application file for complete search history.

(56) References Cited

U.S. PATENT DOCUMENTS

| | | |
|---|---|---|
| 2013/0194931 A1 | 8/2013 | Lee et al. |
| 2015/0117353 A1 | 4/2015 | Takeda et al. |
| 2015/0181574 A1 | 6/2015 | Lee et al. |

FOREIGN PATENT DOCUMENTS

| | | |
|---|---|---|
| JP | 2013-255209 A | 12/2013 |
| JP | 2015-530026 A | 10/2015 |

OTHER PUBLICATIONS

International Search Report issued in PCT/JP2017/022108 dated Sep. 5, 2017 (2 pages).
Written Opinion of the International Searching Authority issued in in PCT/JP2017/022108 dated Sep. 5, 2017 (4 pages).
Motorola Mobility; "Remaining Details of EPDCCH Search Space"; 3GPP TSG RAN WG1 #71, R1-125146; New Oeleans, USA; Nov. 12-16, 2012 (5 pages).

(Continued)

*Primary Examiner* — Melvin C Marcelo
(74) *Attorney, Agent, or Firm* — Osha Bergman Watanabe & Burton LLP

(57) ABSTRACT

According to the present invention, when communication is carried out using different formats from those of existing LTE systems, control channels can be communicated properly. A user terminal, according to one aspect of the present invention, includes a receiving section that receives a DL control channel, and a control section that controls monitoring of DL control channel candidates, and the control section determines the aggregation level to monitor and/or the number of DL control channel candidates based on the DCI format and/or the DCI payload size.

6 Claims, 18 Drawing Sheets

NUMBER OF RESOURCE UNITS IN CORESET 1 =2

| | AL=1 | AL=2 | AL=4 | AL=8 |
|---|---|---|---|---|
| DCI FORMAT Y | Y11 | Y12 | Y13 | Y14 |
| DCI FORMAT X | X11 | X12 | X13 | X14 |

NUMBER OF RESOURCE UNITS IN CORESET 2 =2

| | AL=1 | AL=2 | AL=4 | AL=8 |
|---|---|---|---|---|
| DCI FORMAT Y | Y41 | Y42 | Y43 | Y44 |
| DCI FORMAT X | X41 | X42 | X43 | X44 |

(56) References Cited

OTHER PUBLICATIONS

CATT; "Configuration aspects of the NR-PDCCH"; 3GPP TSG RAN WG1 Meeting #89, R1-1707497; Hangzhou, P.R. China; May 15-19, 2017 (4 pages).
Samsung; "Configurations for PDCCH Monitoring"; 3GPP TSG RAN WG1 #89, R1-1707991; Hangzhou, China; May 15-19, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Extended European Search Report issued in counterpart European Patent Application No. 17913351.7, dated Nov. 24, 2020 (10 pages).
Office Action issued in counterpart European Application No. 17913351.7 dated Aug. 6, 2021 (6 pages).
Office Action in counterpart Japanese Application No. 2019-524654 dated Sep. 21, 2021 (6 pages).

|  | AL=1 | AL=2 | AL=4 | AL=8 |
|---|---|---|---|---|
| DCI FORMAT 0/1A | 6 | 6 | 2 | 2 |
| DCI FORMAT X | 6 | 6 | 2 | 2 |

EXAMPLE 1

|  | AL=1 | AL=2 | AL=4 | AL=8 |
|---|---|---|---|---|
| DCI FORMAT Y | N1 | N2 | N3 | - |
| DCI FORMAT X | - | N2 | N3 | N4 |

FIG. 3B

EXAMPLE 2

|  | AL=1 | AL=2 | AL=4 | AL=8 |
|---|---|---|---|---|
| DCI FORMAT Y | N1 | N2 | - | - |
| DCI FORMAT X | - | - | N3 | N4 |

FIG. 3C

EXAMPLE 3

|  | AL=1 | AL=2 | AL=4 | AL=8 |
|---|---|---|---|---|
| DCI FORMAT Y | N1 | N2 | N3 | N4 |
| DCI FORMAT X | - | - | N3 | N4 |

FIG. 4A

EXAMPLE 1

|  | AL=1 | AL=2 | AL=4 | AL=8 |
|---|---|---|---|---|
| DCI FORMAT Y | N1 | N2 | N3 | N4 |
| DCI FORMAT X | N1 | N2 | M3 | M4 |

FIG. 4B

EXAMPLE 2

|  | AL=1 | AL=2 | AL=4 | AL=8 |
|---|---|---|---|---|
| DCI FORMAT Y | N1 | N2 | N3 | N4 |
| DCI FORMAT X | M1 | M2 | M3 | M4 |

FIG. 5A

EXAMPLE 1

|  | AL=1 | AL=2 | AL=4 | AL=8 |
|---|---|---|---|---|
| DCI FORMAT Y | N1 | N2 | N3 | - |
| DCI FORMAT X | - | M2 | M3 | M4 |

FIG. 5B

EXAMPLE 2

|  | AL=1 | AL=2 | AL=4 | AL=8 |
|---|---|---|---|---|
| DCI FORMAT Y | N1 | N2 | - | - |
| DCI FORMAT X | - | - | M3 | M4 |

FIG. 5C

EXAMPLE 3

|  | AL=1 | AL=2 | AL=4 | AL=8 |
|---|---|---|---|---|
| DCI FORMAT Y | N1 | N2 | N3 | N4 |
| DCI FORMAT X | - | - | M3 | M4 |

FIG. 6A

PATTERN 1

| AL | AL=1 | AL=2 | AL=4 | AL=8 |
|---|---|---|---|---|
| NUMBER OF BLIND DECODING CANDIDATES | N1 | N2 | - | - |

FIG. 6B

PATTERN 2

| AL | AL=1 | AL=2 | AL=4 | AL=8 |
|---|---|---|---|---|
| NUMBER OF BLIND DECODING CANDIDATES | - | - | N3 | N4 |

FIG. 6C

PATTERN 3

| AL | AL=1 | AL=2 | AL=4 | AL=8 |
|---|---|---|---|---|
| NUMBER OF BLIND DECODING CANDIDATES | N1 | N2 | N3 | N4 |

FIG. 7A
PATTERN 1

|  | AL=1 | AL=2 | AL=4 | AL=8 |
|---|---|---|---|---|
| DCI FORMAT Y | N1 | N2 | N3 | N4 |
| DCI FORMAT X | N1 | N2 | N3 | N4 |

FIG. 7B
PATTERN 2

|  | AL=1 | AL=2 | AL=4 | AL=8 |
|---|---|---|---|---|
| DCI FORMAT Y | N1 | N2 | N3 | N4 |
| DCI FORMAT X | M1 | M2 | M3 | M4 |

FIG. 7C
PATTERN 3

|  | AL=1 | AL=2 | AL=4 | AL=8 |
|---|---|---|---|---|
| DCI FORMAT Y | N1 | N2 | - | - |
| DCI FORMAT X | - | - | M3 | M4 |

FIG. 7D
PATTERN 4

|  | AL=1 | AL=2 | AL=4 | AL=8 |
|---|---|---|---|---|
| DCI FORMAT Y | N1 | N2 | N3 | - |
| DCI FORMAT X | - | M2 | M3 | M4 |

FIG. 9A

|              | AL=1 | AL=2 | AL=4 | AL=8 |
|--------------|------|------|------|------|
| DCI FORMAT Y | N1   | N2   | N3   | N4   |
| DCI FORMAT X | M1   | M2   | M3   | M4   |

FIG. 9B

|              | AL=1 | AL=2 | AL=4 | AL=8 |
|--------------|------|------|------|------|
| DCI FORMAT Y | N1   | N2   | -    | -    |
| DCI FORMAT X | M1   | M2   | -    | -    |

FIG. 9C

|              | AL=1 | AL=2 | AL=4 | AL=8 |
|--------------|------|------|------|------|
| DCI FORMAT Y | -    | -    | N3   | N4   |
| DCI FORMAT X | -    | -    | M3   | M4   |

FIG. 9D

|              | AL=1 | AL=2 | AL=4 | AL=8 |
|--------------|------|------|------|------|
| DCI FORMAT Y | N1   | N2   | N3   | N4   |
| DCI FORMAT X | M1   | M2   | M3   | M4   |

FIG. 9E

|              | AL=1 | AL=2 | AL=4 | AL=8 |
|--------------|------|------|------|------|
| DCI FORMAT Y | Y1   | Y2   | Y3   | Y4   |
| DCI FORMAT X | X1   | X2   | X3   | X4   |

FIG. 9F

|              | AL=1  | AL=2  | AL=4  | AL=8  |
|--------------|-------|-------|-------|-------|
| DCI FORMAT Y | N1-Y1 | N2-Y2 | N3-Y3 | N4-Y4 |
| DCI FORMAT X | M1-X1 | M2-X2 | M3-X3 | M4-X4 |

| | AL=1 | AL=2 | AL=4 | AL=8 |
|---|---|---|---|---|
| DCI FORMAT Y | N1 | N2 | N3 | N4 |
| DCI FORMAT X | M1 | M2 | M3 | M4 |

| | AL=1 | AL=2 | AL=4 | AL=8 |
|---|---|---|---|---|
| DCI FORMAT Y | N1 | N2 | - | - |
| DCI FORMAT X | - | - | - | - |

| | AL=1 | AL=2 | AL=4 | AL=8 |
|---|---|---|---|---|
| DCI FORMAT Y | - | - | N3 | N4 |
| DCI FORMAT X | - | - | - | - |

| | AL=1 | AL=2 | AL=4 | AL=8 |
|---|---|---|---|---|
| DCI FORMAT Y | - | - | - | - |
| DCI FORMAT X | - | - | M3 | M4 |

| | AL=1 | AL=2 | AL=4 | AL=8 |
|---|---|---|---|---|
| DCI FORMAT Y | - | - | - | - |
| DCI FORMAT X | M1 | M2 | - | - |

FIG. 11A

NUMBER OF RESOURCE UNITS IN CORESET =2

|              | AL=1 | AL=2 | AL=4 | AL=8 |
|--------------|------|------|------|------|
| DCI FORMAT Y | N11  | N12  | N13  | N14  |
| DCI FORMAT X | M11  | M12  | M13  | M14  |

FIG. 11B

NUMBER OF RESOURCE UNITS IN CORESET =4

|              | AL=1 | AL=2 | AL=4 | AL=8 |
|--------------|------|------|------|------|
| DCI FORMAT Y | N21  | N22  | N23  | N24  |
| DCI FORMAT X | M21  | M22  | M23  | M24  |

FIG. 11C

NUMBER OF RESOURCE UNITS IN CORESET =8

|              | AL=1 | AL=2 | AL=4 | AL=8 |
|--------------|------|------|------|------|
| DCI FORMAT Y | N31  | N32  | N33  | N34  |
| DCI FORMAT X | M31  | M32  | M33  | M34  |

FIG. 12A

NUMBER OF RESOURCE UNITS IN CORESET 1 =2

|              | AL=1 | AL=2 | AL=4 | AL=8 |
|--------------|------|------|------|------|
| DCI FORMAT Y | Y11  | Y12  | Y13  | Y14  |
| DCI FORMAT X | X11  | X12  | X13  | X14  |

NUMBER OF RESOURCE UNITS IN CORESET 2 =2

|              | AL=1 | AL=2 | AL=4 | AL=8 |
|--------------|------|------|------|------|
| DCI FORMAT Y | Y41  | Y42  | Y43  | Y44  |
| DCI FORMAT X | X41  | X42  | X43  | X44  |

FIG. 12B

NUMBER OF RESOURCE UNITS IN CORESET 1 =4

|              | AL=1 | AL=2 | AL=4 | AL=8 |
|--------------|------|------|------|------|
| DCI FORMAT Y | Y21  | Y22  | Y23  | Y24  |
| DCI FORMAT X | X21  | X22  | X23  | X24  |

NUMBER OF RESOURCE UNITS IN CORESET 2 =4

|              | AL=1 | AL=2 | AL=4 | AL=8 |
|--------------|------|------|------|------|
| DCI FORMAT Y | Y51  | Y52  | Y53  | Y54  |
| DCI FORMAT X | X51  | X52  | X53  | X54  |

FIG. 12C

NUMBER OF RESOURCE UNITS IN CORESET 1 =4

|              | AL=1 | AL=2 | AL=4 | AL=8 |
|--------------|------|------|------|------|
| DCI FORMAT Y | Y31  | Y32  | Y33  | Y34  |
| DCI FORMAT X | X31  | X32  | X33  | X34  |

NUMBER OF RESOURCE UNITS IN CORESET 2 =2

|              | AL=1 | AL=2 | AL=4 | AL=8 |
|--------------|------|------|------|------|
| DCI FORMAT Y | Y61  | Y62  | Y63  | Y64  |
| DCI FORMAT X | X61  | X62  | X63  | X64  |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

A radio base station controls the allocation (scheduling) of data for a user terminal, and reports the schedule of data to the user terminal using downlink control information (DCI). The user terminal monitors the downlink control channel (PDCCH) in which the downlink control information is transmitted, performs receiving processes (demodulation process, decoding process, etc.), and controls receipt of DL data and/or transmission of uplink data based on downlink control information that is received.

The transmission of the downlink control channel (PDCCH/EPDCCH) is controlled by using an aggregation of one or more control channel elements (CCEs)/ECCEs (Enhanced Control Channel Elements). Also, every control channel element is comprised of a plurality of resource element groups (REGs/EREGs (Enhanced Resource Element Groups)). Resource element groups are also used when control channels are mapped to resource elements (REs).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, LTE Rel. 14, 15 or later versions, 5G, NR, etc.) are assumed to control data scheduling based on different configurations than existing LTE systems (for example, LTE Rel. 13 or earlier versions). To be more specific, future radio communication systems are required to support flexible use of numerologies and frequencies, and realize dynamic frame formats. A "numerology" refers to, for example, a set of communication parameters (for example, subcarrier spacing, bandwidth, etc.) applied when transmitting/receiving certain signals.

Also, future radio communication systems are under research to apply different configurations from those of existing LTE systems to control channels and/or data channels. In the event of configurations that are different than existing LTE systems are used, there is a risk that communication cannot be performed properly by using control channel formats for existing LTE systems.

The present invention has been made in view of the above, and it is therefore an object of the present invention to provide a user terminal and a radio communication method, whereby control channels can be communicated properly when communication is carried out using different formats from those of existing LTE systems.

Solution to Problem

A user terminal according to one aspect of the present invention includes a receiving section that receives a DL control channel, and a control section that controls monitoring of DL control channel candidates, and the control section determines the aggregation level to monitor and/or the number of DL control channel candidates based on the DCI format and/or the DCI payload size.

Advantageous Effects of Invention

According to the present invention, when communication is carried out using different formats from those of existing LTE systems, control channels can be communicated properly.

BRIEF DESCRIPTION OF DRAWINGS

FIG. 2 is a diagram to show examples of aggregation levels and the numbers of PDCCH candidates in existing LTE;

FIGS. 3A to 3C are diagrams to show examples of first search space designs;

FIGS. 4A and 4B are diagrams to show examples of second search space designs;

FIGS. 5A to 5C are diagrams to show examples of third search space designs;

FIGS. 6A to 6C are diagrams to show examples of second configuration methods;

FIGS. 7A to 7D are diagrams to show examples of third configuration methods;

FIGS. 9A to 9F are diagrams to show examples of case 3;

FIGS. 11A to 11C are diagrams, each showing a search space for 1 CORESET;

FIGS. 12A to 12C are diagrams, each showing search spaces for a number of CORESETs;

DESCRIPTION OF EMBODIMENTS

Figure 1B:
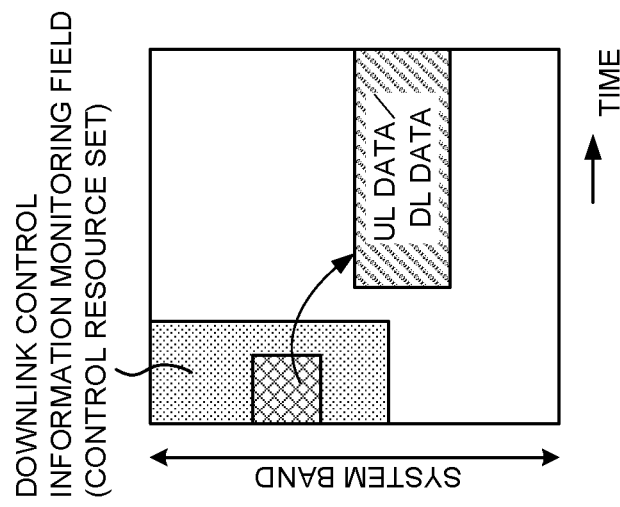
FIGS. 1A and 1B are diagrams to show examples of downlink control channels in existing LTE and future radio communication systems.

In existing LTE systems, a radio base station transmits downlink control information (DCI) to UE by using a downlink control channel (for example, a PDCCH (Physical Downlink Control CHannel), an enhanced PDCCH (EPDCCH, etc.). Transmission of downlink control information may be interpreted as meaning transmission of downlink control channels.

The DCI may be scheduling information, including, for example, at least one of information to specify time/frequency resources to schedule data, information to specify transport block size, information to specify data modulation scheme, information to specify HARQ process indicator, information about demodulation RS, and the like. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant."

DL assignment and/or UL grant may include information about the resource, sequence, transmission format and so on, of the channel for transmitting UL control signals (UCI (Uplink Control Information)) such as HARQ-ACK feedback in response to DL data, channel measurement information (CSI (Channel State Information)) and so on. Also, DCI to schedule UL control signals (UCI (Uplink Control Information)) may be defined apart from DL assignment and UL grant. Whether DCI is a DL assignment, a UL grant, or UCI-scheduling DCI may be determined based on the value of a specific bit field included in the DCI, or may be determined based on which of a number of given values the DCI's payload size is, or may be determined based on in which resource region the DCI is detected, assuming that each DCI is mapped to a different resource region in advance.

UE is configured to monitor a set of a given number of downlink control channel candidates. To "monitor" in this case means, for example, attempting to decode every downlink control channel in this set, with respect to a target DCI format. Such decoding is also referred to as "blind decoding (BD)" or "blind detection." A downlink control channel candidate may be referred to as a "BD candidate," a "(E) PDCCH candidate," and so on.

A set of downlink control channel candidates (multiple downlink control channel candidates) to be monitored is also referred to as a "search space." A base station places DCI in a given downlink control channel candidate included in the search space. The UE performs blind decoding for one or more candidate resources in the search space, and detects DCI addressed to the UE. The search space may be configured by high layer signaling that is common between users, or may be configured by user-specific high layer signaling. Also, two or more search spaces may be configured, for the user terminal, in the same carrier.

In existing LTE, a plurality of aggregation levels (ALs) are defined for search spaces for the purpose of link adaptation. AL corresponds to the number of control channel elements (CCEs) and/or enhanced control channel elements (ECCEs) that constitute DCI. Also, a search space is configured so that there are multiple downlink control channel candidates for a given AL. Each downlink control channel candidate is comprised of one or more resource units (CCEs and/or ECCEs).

Cyclic redundancy check (CRC) bits are attached to DCI. The CRC bits are masked (scrambled) using UE-specific identifiers (for example, cell-radio network temporary identifiers (C-RNTIs)) or a system-common identifier. The UE can detect DCI in which the CRC bits are scrambled using the C-RNTI for the subject terminal, and DCI in which the CRC bits are scrambled using a system-common identifier.

Also, a search space may be a common search space, which is configured for UEs on a shared basis, or a UE-specific search space, which is configured for an individual UE. In the UE-specific search space for the existing LTE PDCCH, the ALs (=the numbers of CCEs) are 1, 2, 4 and 8. The numbers of BD candidates defined in association with ALs=1, 2, 4 and 8 are 6, 6, 2 and 2, respectively.

Figure 1A:
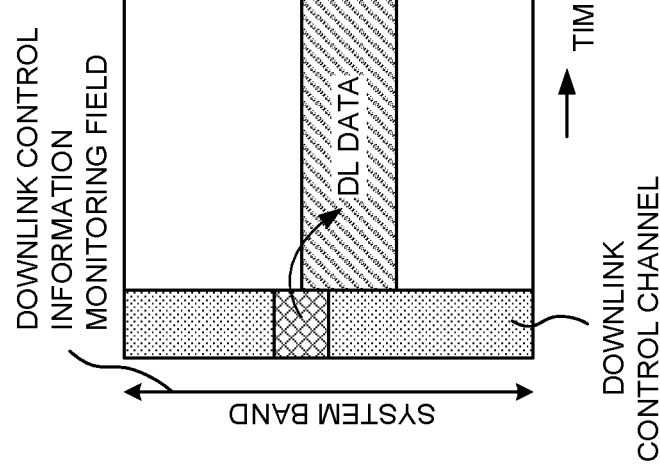

Now, in conventional LTE systems, a downlink control channel (or downlink control information) is transmitted by using the whole system bandwidth (see FIG. 1A). Therefore, regardless of whether or not DL data is allocated in each subframe, a UE needs to monitor the whole system bandwidth to receive (blind-decode) downlink control information.

By contrast with this, in future radio communication systems, communication may not be performed using the whole system band in a given carrier at all times, and it is more likely that communication will be controlled by configuring given frequency regions (also referred to as "frequency bands"), dynamically or semi-statically, depending on the purpose of communication and/or the communicating environment. For example, in future radio communication systems, downlink control information for a given UE needs not be necessarily allocated over the whole system band and transmitted, and, instead, it may be possible to configure a given frequency region to control transmission of downlink control information (see FIG. 1B).

A radio resource that is comprised of a given frequency region and time region configured for a UE may be referred to as a "control resource set (CORSET)," a "control subband," a "search space set," a "search space resource set," a "control region," a "control subband," an "NR-PDCCH region," and so on.

A control resource set is comprised of given resource units, and can be configured to be equal to or less than the system bandwidth (carrier bandwidth) or the maximum bandwidth where the user terminal can perform receiving processes. For example, a control resource set may be comprised of one or more RBs (PRBs and/or VRBs) in the frequency direction. Here, an RB refers to, for example, a frequency resource block unit comprised of 12 subcarriers. The UE can monitor for downlink control information within the range of the control resource set, and control receipt. By this means, in the receiving process of downlink control information, the UE does not have to keep monitoring the whole system bandwidth at all times, so that its power consumption can be reduced.

Also, a control resource set refers to resources where downlink control information is mapped, or a time resource and/or frequency resource frame for accommodating the NR-PDCCH. Furthermore, a control resource set can be defined depending on the size of resource units. For example, the size of 1 control resource set can be configured to be an integer multiple of the size of a resource unit. Also, a control resource set may be comprised of consecutive or non-consecutive resource units.

A resource unit refers to the fundamental unit of resources to allocate to the NR-PDCCH, and may be one of an NR-CCE, an NR-REG and REG group.

In NR, the UE needs to monitor one or more DCI formats and/or DCI sizes. For example, some DCI formats (for example, DCI format 0/1A) are used for fallback, and some DCI formats (for example, DCI format 2C/4) are used for data scheduling, which is controlled based on transmission mode and the like.

The principles of search space design in LTE may be reused in NR. Multiple aggregation levels (ALs) may be supported. Multiple blind-decoding candidates (for example, PDCCH candidates) may be defined for 1 AL.

In LTE, the search space to monitor (the AL to monitor and the number of PDCCH candidates) is the same for all DCI formats for a given UE. For example, as shown in FIG. 2, in DCI format 0/1A, the numbers of PDCCH candidates corresponding to AL=1, 2, 4 and 8 are 6, 6, 2 and 2, respectively. Also, in other DCI formats X, too, the number of PDCCH candidates is the same for every AL.

However, the size of DCI (DCI payload size) to be monitored by the UE varies significantly. For example, in LTE, the size of DCI monitored by 1 UE may be 40 bits to 70 bits. Also, the AL to be required varies depending on the DCI format and/or the DCI size.

By contrast with this, in existing LTE, even in DCI formats with little payload (for example, 0/1A) or in DCI formats with large payload for MIMO scheduling or the like (for example, X or 2/2A/2C), as shown in FIG. 2, the number of times of BD is distributed uniformly among a plurality of ALs.

Also, depending on DCI, use cases vary significantly. For example, some DCI formats are only used when coverage is degraded, or used to support communication during unreliable periods, such as during reconfiguration and the like. In this way, while it is unlikely that a particular DCI format will be used, UE will perform blind decoding the same number of times in other DCI formats likely to be transmitted.

In this way, it is not efficient to apply the same search space design to all DCI formats and/or DCI sizes to monitor (including, for example, the AL to monitor, the number of blind-decoding candidates, etc.).

So the present inventors have come up with the idea of using different search spaces for different DCI formats and/or DCI sizes. One example of the present invention provides search space designs to support varying DCI formats and/or DCI sizes. Also, one example of the present invention will provide methods for configuring these search spaces.

According to the search space designs of the present invention, search spaces that are suitable for varying DCI formats and/or DCI sizes can be provided, and unnecessary blind decoding can be reduced.

Now, embodiments of the present invention will be described below in detail with reference to the accompanying drawings. Note that the radio communication methods according to the herein-contained embodiments may be used individually or may be used in combination.

Radio Communication Method

First Example

The first example of the present invention will show a number of search space designs.

First Search Space Design

In the first search space design, UE monitors different ALs depending on DCI formats and/or DCI sizes. Also, the number of blind-decoding candidates (for example, the number of PDCCH candidates) corresponding to 1 AL to be monitored is the same in all DCI formats and/or DCI sizes. FIG. 3 are diagrams to show examples of first search space designs.

Referring to example 1 shown in FIG. 3A, in DCI format Y, ALs=1, 2 and 4 are monitored. In other words, in DCI format Y, ALs=1, 2 and 4 can be used. In DCI format X, ALs=2, 4 and 8 are monitored. When DCI format Y is used, the numbers of blind-decoding candidates for ALs=1, 2 and 4 are N1, N2 and N3, respectively. Also, when DCI format X is used, the numbers of blind-decoding candidates for ALs=2, 4 and 8 are N2, N3 and N4, respectively.

Referring to example 2 shown in FIG. 3B, in DCI format Y, ALs=1 and 2 are monitored. In DCI format X, ALs=4 and 8 are monitored. When DCI format Y is used, the numbers of blind-decoding candidates for ALs=1 and 2 are N1 and N2, respectively. In addition, when DCI format X is used, the numbers of blind-decoding candidates for ALs=4 and 8 are N3 and N4, respectively.

Referring to example 3 shown in FIG. 3C, in DCI format Y, ALs=1, 2, 4 and 8 are monitored. In DCI format X, ALs=4 and 8 are monitored. In addition, when DCI format Y is used, the numbers of blind-decoding candidates for ALs=1, 2, 4 and 8 are N1, N2, N3 and N4, respectively. In addition, when DCI format X is used, the numbers of blind-decoding candidates for ALs=4 and 8 are N3 and N4, respectively.

According to the first search space design, UE may monitor specific ALs or skip monitoring of specific ALs, when a particular DCI format is used.

For example, when the payload of DCI format X is large and AL=1 or ALs=1 and 2 are not likely to be used in DCI format X, and the payload of DCI format Y is small and various ALs are likely to be used in DCI format Y, by using the first search space design, unnecessary blind decoding can be reduced in specific DCI formats and specific ALs.

Second Search Space Design

In the second search space design, the same ALs are monitored in all DCI formats and/or DCI sizes. Also, the number of blind-decoding candidates for 1 AL to monitor may vary per DCI format and/or DCI size. FIG. 4 are diagrams to show examples of second search space designs.

Referring to example 1 shown in FIG. 4A, in DCI format Y, ALs=1, 2, 4 and 8 are monitored. In DCI format X, ALs=1, 2, 4 and 8 are monitored. Also, when DCI format Y is used, the numbers of blind-decoding candidates for ALs=1, 2, 4 and 8 are N1, N2, N3 and N4, respectively. Also, when DCI format X is used, the numbers of blind-decoding candidates for ALs=1, 2, 4 and 8 are N1, N2, M3 and M4, respectively.

Referring to example 2 shown in FIG. 4B, in DCI format Y, AL=1, 2, 4 and 8 are monitored. In DCI format X, ALs=1, 2, 4 and 8 are monitored. In addition, when DCI format Y is used, the numbers of blind-decoding candidates for ALs=1, 2, 4 and 8 are N1, N2, N3 and N4, respectively. Also, when DCI format X is used, the numbers of blind-decoding candidates for ALs=1, 2, 4 and 8 are M1, M2, M3 and M4, respectively.

The ALs to be used and/or the ALs for typical use might vary depending on DCI format, DCI size and/or the quality required, and the numbers of blind-decoding candidates corresponding to the ALs to be monitored might be distributed differently. According to the second search space design, unnecessary blind decoding can be reduced by configuring the number of blind-decoding candidates suitable for the DCI format, the DCI size, and/or the quality required.

Third Search Space Design

In a third search space design, different ALs may be monitored depending on DCI formats and/or DCI sizes. Also, the number of blind-decoding candidates for 1 AL to be monitored may vary depending on the DCI format and/or the DCI size. FIG. 5 are diagrams to show examples of third search space designs.

Referring to example 1 shown in FIG. 5A, in DCI format Y, ALs=1, 2 and 4 are monitored. In DCI format X, ALs=2, 4 and 8 are monitored. When DCI format Y is used, the numbers of blind-decoding candidates for ALs=1, 2 and 4 are N1, N2 and N3, respectively. Also, when DCI format X is used, the numbers of blind-decoding candidates for ALs=2, 4 and 8 are M2, M3 and M4, respectively.

Referring to example 2 shown in FIG. 5B, in DCI format Y, ALs=1 and 2 are monitored. In DCI format X, ALs=4 and 8 are monitored. Also, when DCI format Y is used, the numbers of blind-decoding candidates for ALs=1 and 2 are N1 and N2, respectively. In addition, when DCI format X is used, the numbers of blind-decoding candidates for ALs=4 and 8 are M3 and M4, respectively.

Referring to example 3 shown in FIG. 5C, in DCI format Y, AL=1, 2, 4 and 8 are monitored. In DCI format X, ALs=4 and 8 are monitored. When DCI format Y is used, the numbers of blind-decoding candidates for ALs=1, 2, 4 and 8 are N1, N2, N3 and N4, respectively. In addition, when DCI format X is used, the numbers of blind-decoding candidates for ALs=4 and 8 are M3 and M4, respectively.

As shown in FIG. 5, as with the first search space design, the ALs to be monitored vary depending on DCI formats. For example, when a specific DCI format is used, specific ALs may be monitored. Also, as shown in FIG. 5, the number of blind decoding candidates for each AL may vary depending on the DCI format, as in the second search space design.

According to the third search space design, unnecessary blind decoding can be reduced by skipping the monitoring of specific ALs of specific DCI formats and/or DCI sizes, as was the case with the first search space design. Also, as was the case with the second search space design, by setting the number of blind decoding candidates suitable for the DCI format, DCI size, and/or the required quality, it is possible to reduce unnecessary blind decoding.

Second Example

The second example of the present invention will show a number of search space configuration methods.

First Configuration Method

According to the first configuration method, the network configures the precise ALs to monitor and the number of blind-decoding candidates, for each DCI format and/or DCI size, in UE, by way of higher layer signaling (for example, RRC signaling).

The network may report configuration information, which indicates the ALs and/or the numbers of blind-decoding candidates linked with DCI formats and/or DCI sizes, to the UE, by way of higher layer signaling. The ALs and the number of blind-decoding candidates corresponding for each DCI format and/or DCI size may, for example, follow any of the search space designs according to the first example.

According to the first configuration method, ALs and numbers of blind-decoding candidates suitable for DCI formats and/or DCI sizes can be configured in UE.

Second Configuration Method

In the second configuration method, multiple search space patterns are configured in UE in advance. Each search space pattern shows a combination of an AL to monitor and the number of blind-decoding candidates for that AL, for 1 DCI format and/or DCI size. Multiple search space patterns may be defined by the specification, or may be reported from the network to the UE.

Search space patterns for different DCI formats are configured in the UE, independently, by means of higher layer signaling (for example, RRC signaling). The network may report configuration information, which indicates the ALs and/or the numbers of blind-decoding candidates linked with DCI formats and/or DCI sizes, by way of higher layer signaling.

FIG. 6 are diagrams to show examples of second configuration methods.

In pattern 1 shown in FIG. 6A, ALs=1 and 2 are monitored, and the numbers of blind-decoding candidates for ALs=1 and 2 are N1 and N2, respectively.

In pattern 2 shown in FIG. 6B, ALs=4 and 8 are monitored, and the numbers of blind-decoding candidates for ALs=4 and 8 are N3 and N4, respectively.

In pattern 3 shown in FIG. 6C, ALs=1, 2, 4 and 8 are monitored, and the numbers of blind-decoding candidates for ALs=1, 2, 4 and 8 are N1, N2, N3, and N4 respectively.

According to a second configuration method, search space patterns corresponding to specific DCI formats and/or DCI sizes are reported by higher layer signaling, so that the ALs to monitor and the number of blind-decoding candidates can be configured depending on which DCI format is monitored by UE and/or which DCI size applies. This can reduce the signaling overhead for configuring search spaces.

Third Configuration Method

In the third configuration method, multiple search space patterns are configured in UE in advance. Each search space pattern shows the ALs to monitor and the numbers of blind-decoding candidates that are respectively associated with a number of DCI formats and/or DCI sizes. These search space patterns may be defined by the specification or may be reported from the network to the UE.

The network configures search space patterns in the UE by way of higher layer signaling (for example, RRC signaling). The network may report the IDs of search space patterns by way of higher layer signaling.

FIG. 7 are diagrams to show examples of second configuration methods. Here, 4 patterns (search space patterns) are defined corresponding to 2 DCI formats and/or DCI sizes to be monitored. One of these 4 patterns is configured in the UE.

Referring to pattern 1 shown in FIG. 7A, ALs=1, 2, 4 and 8 are monitored in DCI format Y, and the numbers of blind-decoding candidates for ALs=1, 2, 4 and 8 are N1, N2, N3 and N4, respectively. Also, similar to DCI format Y, ALs=1, 2, 4 and 8 are monitored in DCI format X, and the numbers of blind-decoding candidates for ALs=1, 2, 4 and 8 are N1, N2, N3 and N4, respectively.

Referring to pattern 2 shown in FIG. 7B, ALs=1, 2, 4 and 8 are monitored in DCI format Y, and the numbers of blind-decoding candidates for ALs=1, 2, 4 and 8 are N1, N2, N3 and N4, respectively. Also, ALs=1, 2, 4 and 8 are monitored in DCI format X, and the numbers of blind-decoding candidates for ALs=1, 2, 4 and 8 are M1, M2, M3 and M4, respectively.

In pattern 3 shown in FIG. 7C, ALs=1 and 2 are monitored in DCI format Y, and the numbers of blind-decoding candidates for ALs=1 and 2 are N1 and N2, respectively. Also, ALs=4 and 8 are monitored in DCI format X, and the numbers of blind-decoding candidates for ALs=4 and 8 are M3 and M4, respectively.

In pattern 4 shown in FIG. 7D, ALs=1, 2 and 4 are monitored in DCI format Y, and the numbers of blind-decoding candidates for ALs=1, 2 and 4 are N1, N2 and N3, respectively. Also, ALs=2, 4 and 8 are monitored in DCI format X, and the numbers of blind-decoding candidates for ALs=2, 4 and 8 are M2, M3 and M4, respectively.

According to a third configuration method, search space patterns corresponding to a number of DCI formats and/or DCI sizes are reported by higher layer signaling, so that the ALs to monitor and the number of blind-decoding candidates can be configured for multiple DCI formats and/or DCI sizes. This can reduce the signaling overhead for configuring search spaces, more than the second configuration method can.

Third Example

A third example of the present invention will describe some examples of the relationship between DCI formats and/or DCI sizes and control resource sets (CORESETs).

The network may report, to the UE, resource information that indicates which CORESETs are associated with which DCI formats and/or DCI sizes, ALs and the numbers of blind-decoding candidates, by way of higher layer signaling. The network may allocate a DL control channel (DCI) associated with a CORESET, in the CORESET, and transmit the DL control channel.

Case 1

In case 1, 1 CORESET provides both DCI formats X and Y for all ALs and all blind-decoding candidates.

Figures 8A, 8B, 8C:
FIGS. 8A to 8C are diagrams to show examples of case 1 and case 2.

As shown in FIG. 8A, the numbers of blind-decoding candidates N1, N2, N3 and N4 corresponding to ALs=1, 2, 4 and 8 of DCI format Y, and the numbers of blind-decoding candidates M1, M2, M3 and M4 corresponding to ALs=1, 2, 4 and 8 of DCI format X are configured for 1 CORESET. That is, as was the case with the second search space design described above, different numbers of blind-decoding candidates are configured for different DCI formats.

In case 1, UE can monitor multiple DCI formats and/or DCI sizes, all ALs, and all blind-decoding candidates that are configured, in 1 CORESET. Also, a DCI format and/or DCI size, ALs, and the number of blind-decoding candidates suitable for a CORESET can be configured.

Case 2

In case 2, 1 CORESET provides either DCI format X or Y for all ALs and all blind-decoding candidates.

At least 2 CORESETs are configured in UE so as to allow the UE to monitor 2 DCI formats. Resource information indicates multiple CORESETs. At least one of ALs, the numbers of blind-decoding candidates, DCI formats, and DCI sizes may be configured on a per CORESET basis.

In FIGS. 8B and 8C, CORESET 1 includes DCI format Y, and CORESET 2 includes DCI format X.

As shown in FIG. 8B, the configuration of DCI format Y in FIG. 8A is configured for CORESET 1. That is, the numbers of blind-decoding candidates N1, N2, N3 and N4, respectively corresponding to ALs=1, 2, 4 and 8 of DCI format Y, are configured for CORESET 1.

As shown in FIG. 8C, the configuration of DCI format X in FIG. 8A is configured for CORESET 2. That is, the numbers of blind-decoding candidates M1, M2, M3 and M4, respectively corresponding to ALs=1, 2, 4 and 8 of DCI format X, are configured for CORESET 2.

In FIGS. 8B and 8C, CORESET 1 includes DCI format Y, and CORESET 2 includes DCI format X. In this way, the UE can monitor both DCI formats X and Y, as in FIG. 8A, by monitoring CORESET 1 and 2 based on the configurations of FIGS. 8B and 8C, respectively.

In this way, DCI formats, ALs, and the numbers of blind-decoding candidates suitable for each CORESET can be configured by allocating and configuring multiple DCI formats into multiple CORESETs, so that the receiving performance of DCI can be improved.

Case 3

In case 3, 1 CORESET provides both DCI formats X and Y having subsets of ALs and blind-decoding candidates.

At least 2 CORESETs are configured in UE so as to allow the UE to monitor all DCI formats. ALs may be linked with CORESETs.

As in FIG. 8A, FIG. 9A shows the numbers of blind-decoding candidates N1, N2, N3 and N4, respectively corresponding to ALs=1, 2, 4 and 8 of DCI format Y, and the numbers of blind-decoding candidates M1, M2, M3 and M4 respectively corresponding to ALs=1, 2, 4 and 8 of DCI format X.

As shown in FIG. 9B, the configuration of ALs=1 and 2 in FIG. 9A is configured for CORESET 1. That is, the numbers of blind-decoding candidates N1 and N2 corresponding to ALs=1 and 2 of DCI format Y, and the numbers of blind-decoding candidates M1 and M2 corresponding to ALs=1 and 2 of DCI format X are configured for CORESET 1.

As shown in FIG. 9C, the configurations of ALs=4 and 8 in FIG. 9A are configured for CORESET 2. That is, the numbers of blind-decoding candidates N3 and N4 corresponding to ALs=4 and 8 of DCI format Y, and the numbers of blind-decoding candidates M3 and M4 corresponding to ALs=4 and 8 of DCI format X are configured for CORESET 2.

According to FIG. 9B and FIG. 9C, CORESET 1 is limited to ALs=1 and 2, and CORESET 2 is limited to ALs=4 and 8. In this way, the UE can monitor all ALs, as in FIG. 9A, by monitoring CORESET 1 and 2 based on the configurations of FIGS. 9B and 9C, respectively.

At least 2 CORESETs are configured in UE so as to allow the UE to monitor all the blind-decoding candidates. The numbers of blind-decoding candidates may be linked with CORESETs.

FIG. 9D is similar to FIG. 8A and FIG. 9A.

As shown in FIG. 9E, the numbers of blind-decoding candidates in FIG. 9D are partially or entirely distributed over CORESET 1. Consequently, Y1 is N1 or less, Y2 is N2 or less, Y3 is N3 or less, Y4 is N4 or less, X1 is M1 or less, X2 is M2 or less, X3 is M3 or less, and X4 is M4 or less. Using these, the numbers of blind-decoding candidates Y1, Y2, Y3 and Y4, respectively corresponding to ALs=1, 2, 4 and 8 of DCI format Y, and the numbers of blind-decoding candidates X1, X2, X3 and X4, respectively corresponding to ALs=1, 2, 4 and 8 of DCI format X are configured for CORESET 1.

As shown in FIG. 9F, of the numbers of blind-decoding candidates in FIG. 9D, the remainder excluding the numbers of blind-decoding candidates assigned to CORESET 1 is configured for CORESET 2. That is, the numbers of blind-decoding candidates N1-Y1, N2-Y2, N3-Y3 and N4-Y4 corresponding to ALs=1, 2, 4 and 8 of DCI format Y, and the numbers of blind-decoding candidates M1-X1, M2-X2, M3-X3 and M4-X4 corresponding to ALs=1, 2, 4 and 8 of DCI format X are configured for CORESET 2.

According to FIGS. 9E and 9F, in each DCI format and each AL, the sum of the number of blind-decoding candidates assigned to CORESET 1 and the number of blind-decoding candidates assigned to CORESET 2 is the number of blind-decoding candidates in FIG. 9D. That is, the numbers of blind-decoding candidates configured for specific DCI formats and specific ALs can be distributed over multiple CORESETs. In this way, the UE can monitor the number of blind-decoding candidates set forth in FIG. 9D, by monitoring CORESETs 1 and 2, based on the configurations of FIGS. 9E and 9F, respectively.

Case 4

In case 4, 1 CORESET provides both DCI formats X and Y having subsets of ALs and blind-decoding candidates.

Now, a case will be shown here where blind-decoding candidates are divided into 4 CORESETs.

Figures 10A, 10B, 10C, 10D, 10E:
FIGS. 10A to 10E are diagrams to show examples of case 4.

As in FIG. 8A, FIG. 10A shows the numbers of blind-decoding candidates N1, N2, N3 and N4 corresponding to ALs=1, 2, 4 and 8 of DCI format Y, and the numbers of blind-decoding candidates M1, M2, M3 and M4 corresponding to ALs=1, 2, 4 and 8 of DCI format X.

As shown in FIG. 10B, the numbers of blind-decoding candidates N1 and N2, respectively corresponding to ALs=1 and 2 of DCI format Y, are configured for CORESET 1.

As shown in FIG. 10C, the numbers of blind-decoding candidates N3 and N4, respectively corresponding to ALs=4 and 8 of DCI format Y, are configured for CORESET 2.

As shown in FIG. 10D, the numbers of blind-decoding candidates M3 and M4, respectively corresponding to ALs=4 and 8 of DCI format X, are configured for CORESET 1.

As shown in FIG. 10E, the numbers of blind-decoding candidates M1 and M2, respectively corresponding to ALs=1 and 2 of DCI format X, are configured for CORESET 4.

Referring to FIGS. 10B and 10C, CORESET 1 and CORESET 2 are limited to DCI format Y, and, of these, CORESET 1 is limited to ALs=1 and 2, and CORESET 2 is limited to ALs=4 and 8. Referring to FIGS. 10D and 10E, CORESET 3 and CORESET 4 are limited to DCI format X, and, of these, CORESET 3 is limited to ALs=4 and 8, and CORESET 4 is limited to ALs=1 and 2.

In this way, the UE can monitor all DCI formats and all ALs, as in FIG. 10A, by monitoring CORESETs 1 to 4 based on the configurations of FIGS. 10B to 10E, respectively.

Variations

When 1 CORESET is configured in UE, the ALs to be monitored in this CORESET and the number of blind-decoding candidates may vary depending on the size of the CORESET. The size of a CORESET may be represented by the number of resource units included in the CORESET (the number of resource units in a CORESET).

The case where the number of resource units in a CORESET is 2 as shown in FIG. 11A, the case where the number of resource units in CORESET is 4 as shown in FIG. 11B, and, the case where the number of resource units in CORESET is 8 as shown in FIG. 11C may be assumed. In each case, the AL to be monitored based on DCI format X and the number of blind-decoding candidates and the AL to be monitored based on DCI format Y and the number of blind-decoding candidates may be configured.

Also, the number of blind-decoding candidates for each DCI format and each AL may be determined on condition that the total of the numbers of blind-decoding candidates in the CORESET is less than or equal to a given value.

For example, the sum of the numbers of blind-decoding candidates for each DCI format (the sum of rows in FIGS. 11A to 11C, and, for example, in DCI format Y of FIG. 11A, N11+N12+N13+N14) may be equal to or less than a given value, or the total of the numbers of blind-decoding candidates in all DCI formats (the sum in each of FIGS. 11A to 11C, and, for example, in FIG. 11A, N11+N12+N13+N14+M11+M12+M13+M14) may be equal to or less than a given value.

When a number of CORESETs are configured in UE, the ALs to be monitored in each CORESET and the number of blind-decoding candidates may vary depending on the number of resource units in each CORESET.

The case where the number of resource units in CORESET 1 is 2 and the number of resource units in CORESET 2 is 2, as shown in FIG. 12A, the case where the number of resource units in CORESET 1 is 4 and the number of resource units in CORESET 2 is 4, as shown in FIG. 12B, and the case where the number of resource units in CORESET 1 is 4 and the number of resource units in CORESET 2 is 2, as shown in FIG. 12C, may be assumed. In each case, the AL to be monitored based on DCI format X and the number of blind-decoding candidates and the AL to be monitored based on DCI format Y and the number of blind-decoding candidates may be configured to each of CORESET 1 and CORESET 2.

As shown in FIG. 12C, if the number of resource units in CORESET 1 is larger than the number of resource units in CORESET 2, the number of blind-decoding candidates of CORESET 1 may be equal to or greater than the number of blind-decoding candidates of CORESET 2.

Also, the number of blind-decoding candidates for each DCI format and each AL of each CORESET may be determined on condition that the total of the numbers of blind-decoding candidates in a number of CORESETs is less than or equal to a given value.

For example, the sum of the numbers of blind-decoding candidates for a number of CORESETs for each DCI format (the sum of rows in FIGS. 12A to 12C, and, for example, in DCI format Y of FIG. 12A, Y11+Y12+Y13+Y14+Y41+Y42+Y43+Y44) may be equal to or less than a given value, or the total of the numbers of blind-decoding candidates in all DCI formats (the sum in each of FIGS. 12A to 12C, and, for example, in FIG. 12A, Y11+Y12+Y13+Y14+Y41+Y42+Y43+Y44+X11+X12+X13+X14+X41+X42+X43+X44) may be equal to or less than a given value.

The number of CORESETs to be configured in UE may vary per UE.

If the size of each CORESET is uniform, the number of blind-decoding candidates in each CORESET may be determined based on one of the total number of CORESETs, the number of CORESETs aligned in the frequency direction, and the number of CORESETs aligned in the time direction. For example, as the total number of CORESETs increases, the number of blind-decoding candidates per CORESET may decrease.

If the size of each CORESET is different, the numbers of blind-decoding candidates may be distributed over multiple CORESETs, depending on the size of CORESET (for example, in proportion to the size of CORESET).

A plurality of CORESETs may be transmitted based on different methods. For example, beamforming may be applied to CORESET 1, and beamforming may not be applied to CORESET 2.

The size and/or the shape (the allocation of resource units) of the plurality of CORESET resources may be different from one another. For example, the frequency resource of CORESET 1 may span the entire system band or the transmission band of UE, and the frequency resource of CORESET 2 may be limited to part of the system band or the transmission band of the UE. Also, for example, the time resource for CORESET 1 may be allocated to be monitored only once in each slot, and the time resource for CORESET 2 may be allocated to be monitored 4 times in each slot.

In this way, a plurality of CORESETs have mutually varying characteristics, so that DCI formats, ALs, and the numbers of blind-decoding candidates suitable for each CORESET can be configured and the receiving performance of DCI can be improved.

Radio Communication System

Now, the structure of a radio communication system according to one embodiment of the present invention will be described below. In this radio communication system, communication is performed using one of the radio communication methods according to the herein-contained embodiments of the present invention, or a combination of these.

Figure 13:
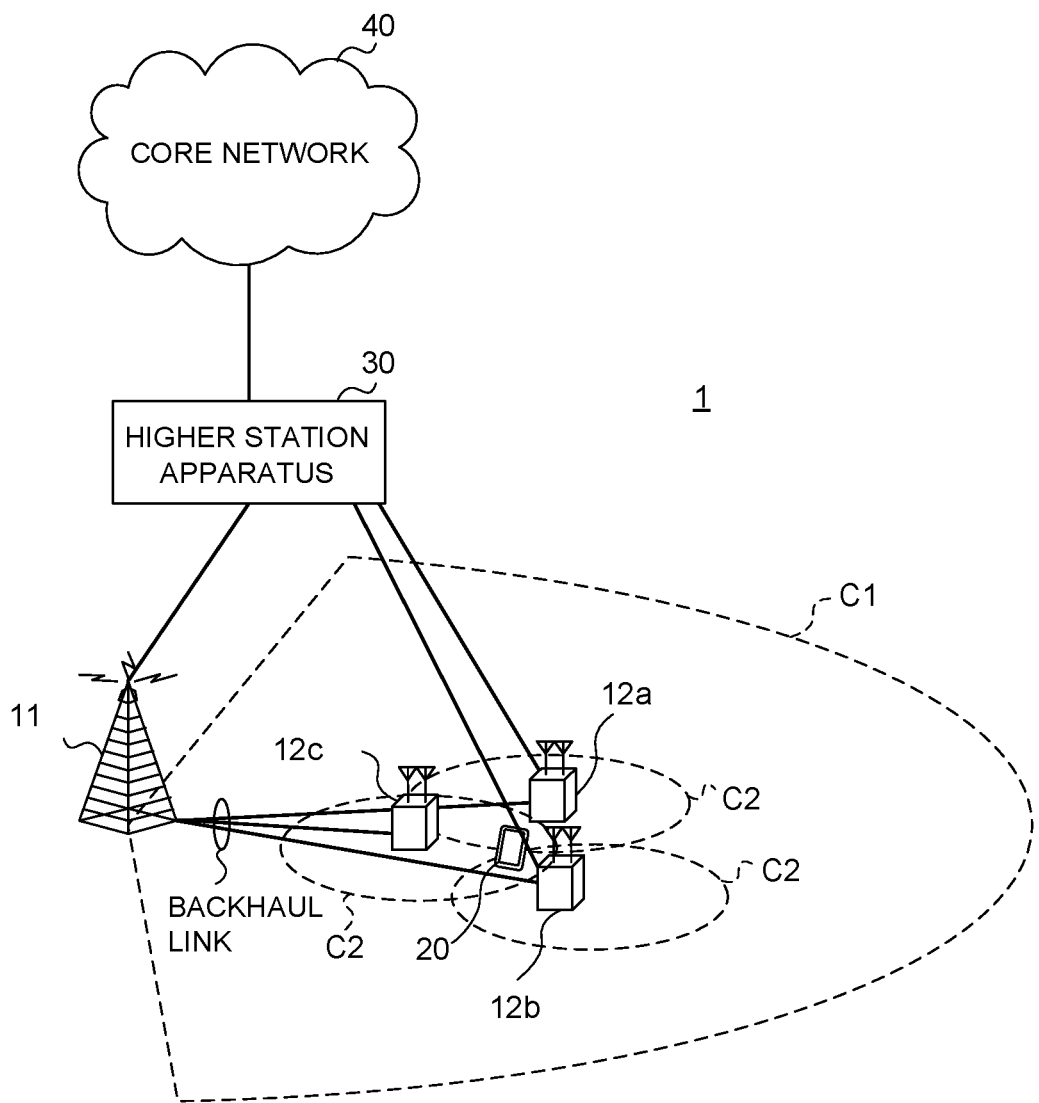
FIG. 13 is a diagram to show an exemplary schematic structure of a radio communication system according to one embodiment of the present invention.

FIG. 13 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

Radio Base Station

Figure 14:
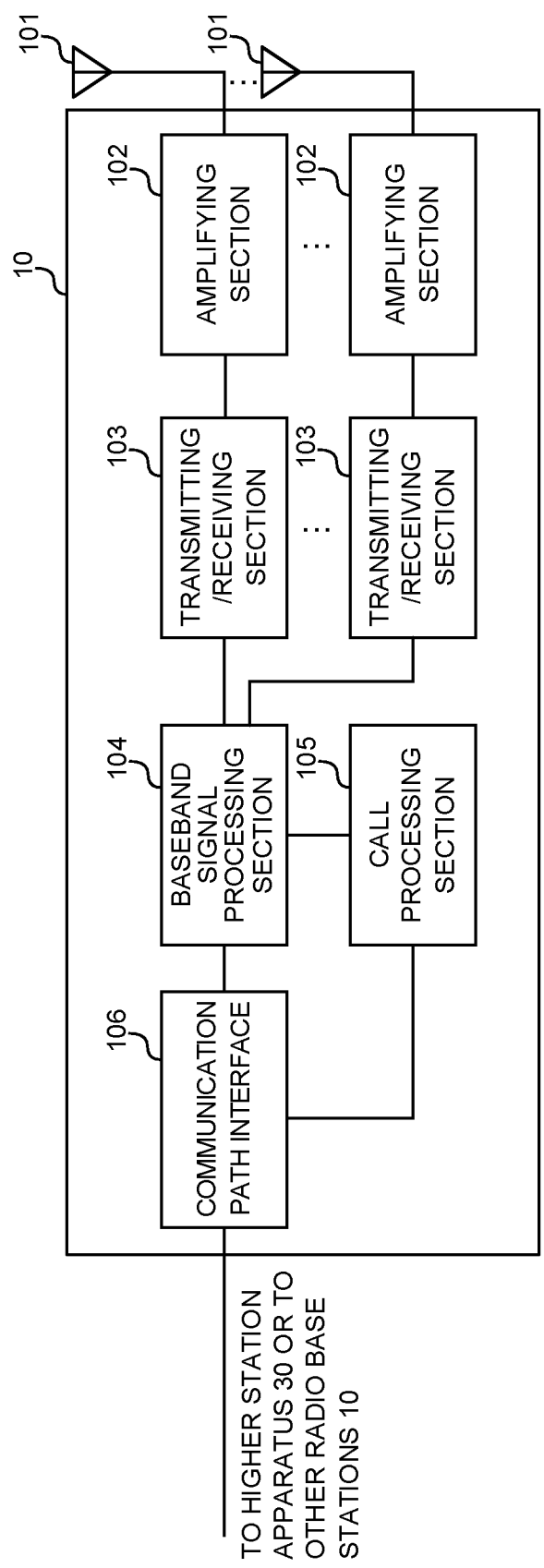
FIG. 14 is a diagram to show an exemplary overall structure of a radio base station according to one embodiment of the present invention.

FIG. 14 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may transmit configuration information to indicate the aggregation level and/or the number of DL control channel candidates associated with a DCI format and/or a DCI payload size, to the user terminal 20. Furthermore, the transmitting/receiving sections 103 may transmit, to the user terminal 20, a DL control channel (for example, PDCCH) based on the DCI format and/or the DCI payload size, the aggregation level and/or the number of DL control channel candidates, configured for the UE.

Furthermore, the transmitting/receiving sections 103 may transmit, to the user terminal 20, resource information that indicates control resource sets (for example, CORESETs) that are associated with DCI formats and/or DCI payload sizes, aggregation levels and the numbers of DL control channel candidates. Also, the transmitting/receiving sections 103 may transmit a DL control channel in CORESETs.

Figure 15:
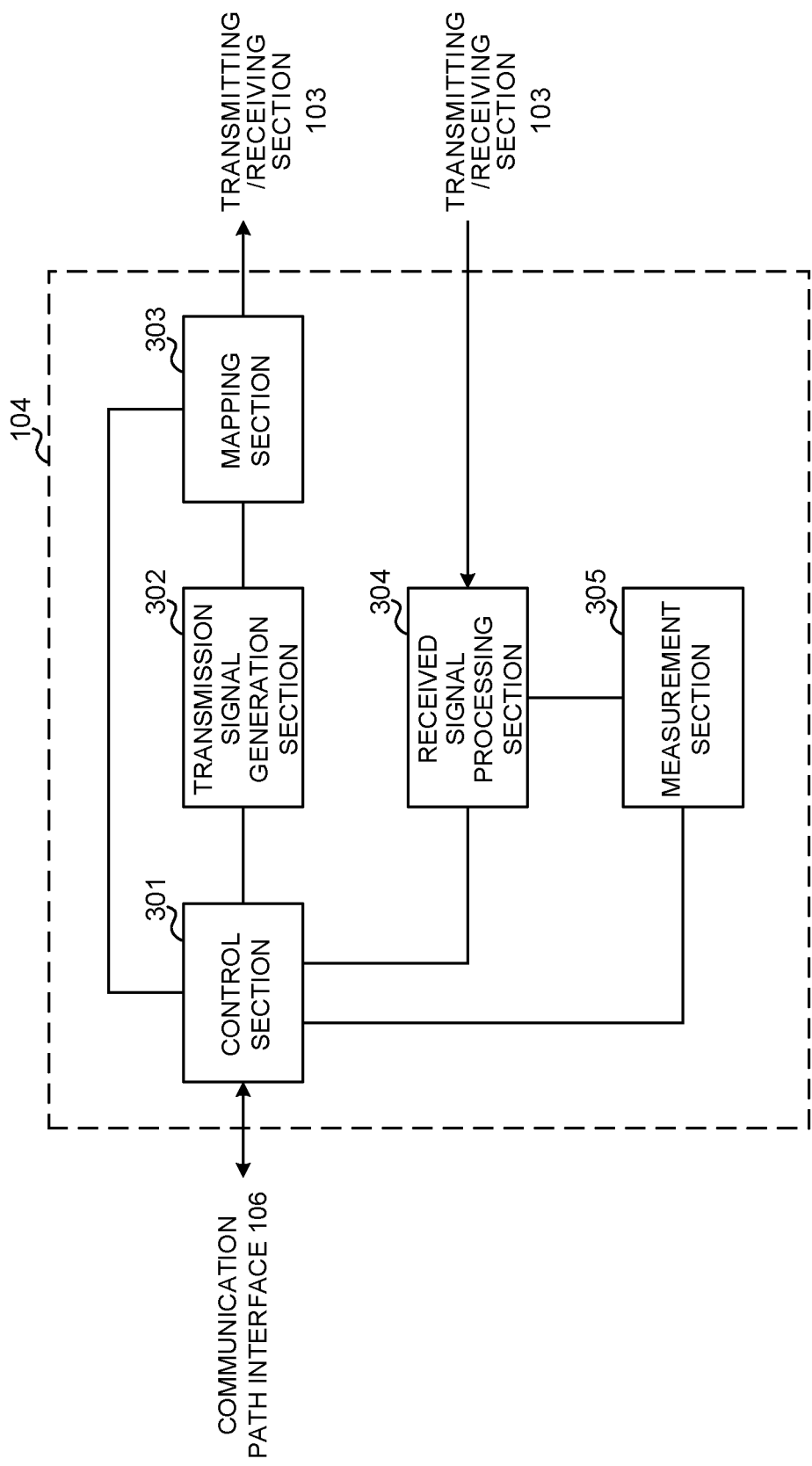
FIG. 15 is a diagram to show an exemplary functional structure of a radio base station according to one embodiment of the present invention.

FIG. 15 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDCCH and/or the EPDCCH). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

Also, the control section 301 may allocate DCI in CORESETs.

User Terminal

Figure 16:
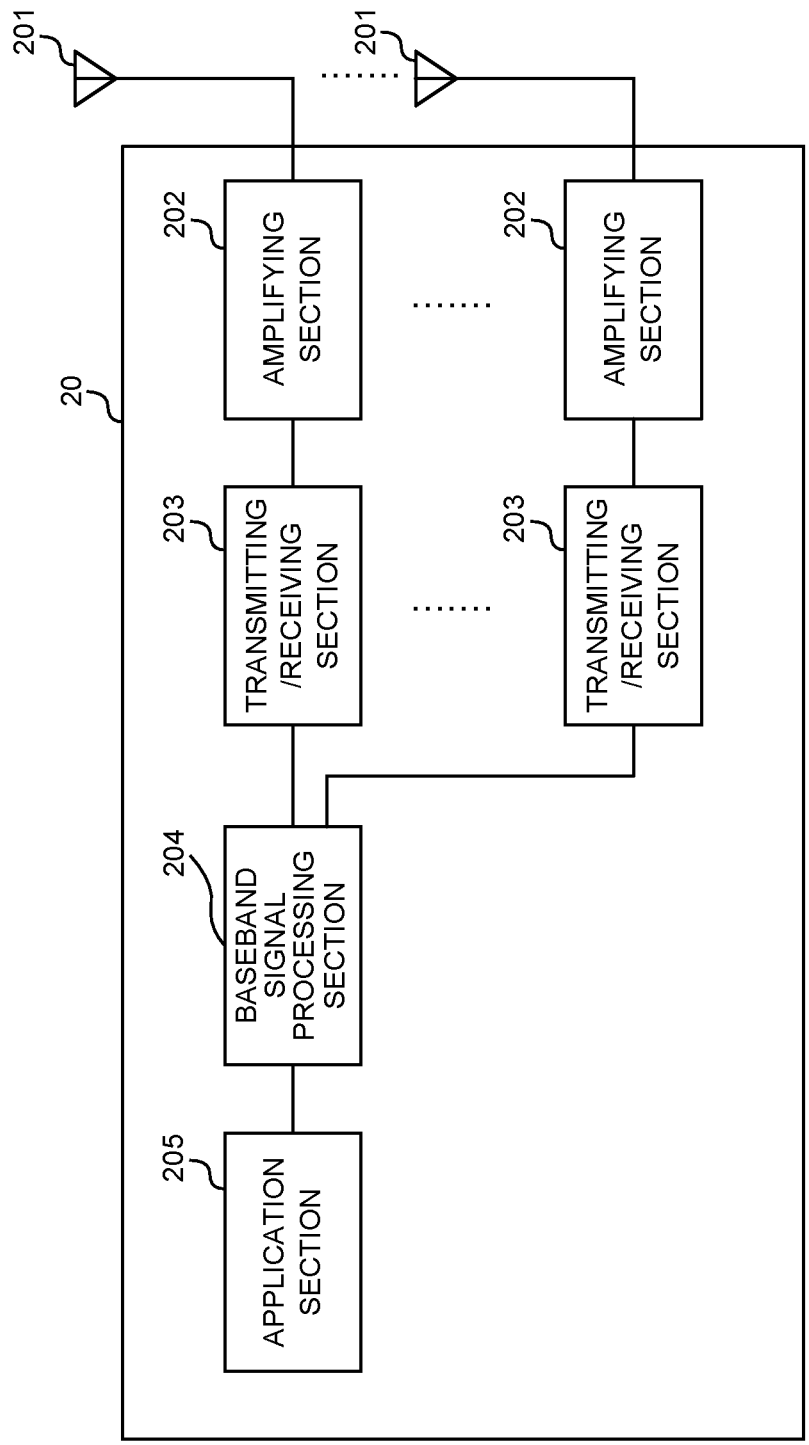
FIG. 16 is a diagram to show an exemplary overall structure of a user terminal according to one embodiment of the present invention.

FIG. 16 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive a DL control channel from the radio base station 10.

Also, the transmitting/receiving sections 203 may receive configuration information to indicate the aggregation level (aggregation level to be monitored by UE) and/or the number of DL control channel candidates (for example, the number of blind-decoding candidates) associated with a DCI format and/or a DCI payload size, from the radio base station 10. The configuration information may show DCI formats and/or DCI payload sizes, and corresponding aggregation levels and/or numbers of DL control channel candidates.

Also, the configuration information may show one of a plurality of pairs of aggregation levels and numbers of DL control channel candidates (for example, search space patterns).

Also, the transmitting/receiving sections 203 may receive resource information to indicate a control resource set associated with a DCI format and/or a DCI payload size, the aggregation level and/or the number of DL control channel candidates from the radio base station 10.

Also, the resource information may indicate a plurality of control resource sets. At least one of the aggregation level, the number of DL control channel candidates, the DCI format, and the DCI payload size may be configured for every control resource set.

Figure 17:
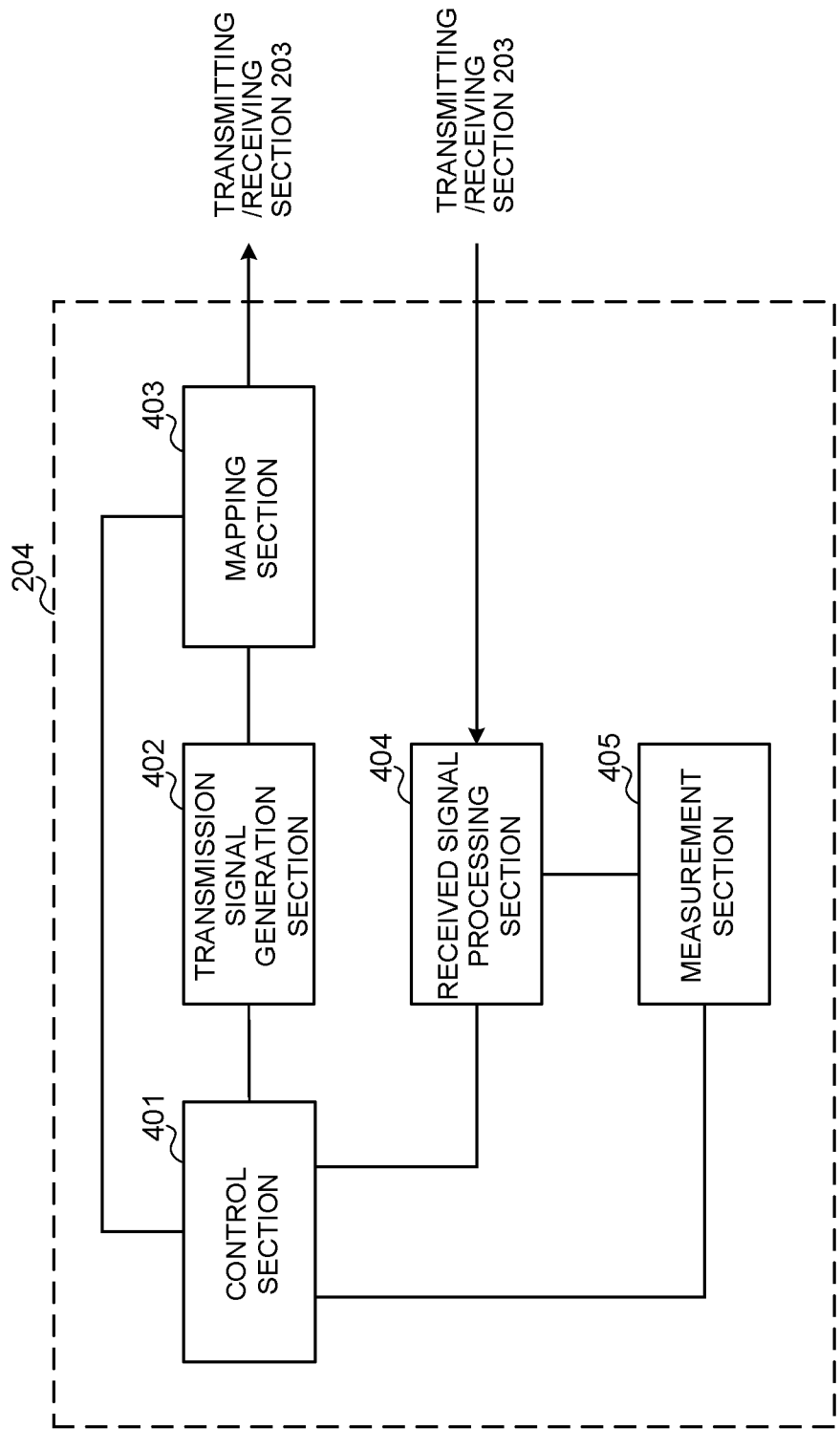
FIG. 17 is a diagram to show an exemplary functional structure of a user terminal according to one embodiment of the present invention.

FIG. 17 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

The control section 401 may also control monitoring (for example, blind decoding) of DL control channel candidates (for example, PDCCH candidates). Also, the control section 401 may determine the aggregation level and/or the number of DL control channel candidates based on the DCI format and/or the DCI payload size.

Also, the control section 401 may control the monitoring of DL control channel candidates based on configuration information.

Furthermore, the control section 401 may control the monitoring of DL control channels in control resource sets.

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 18:
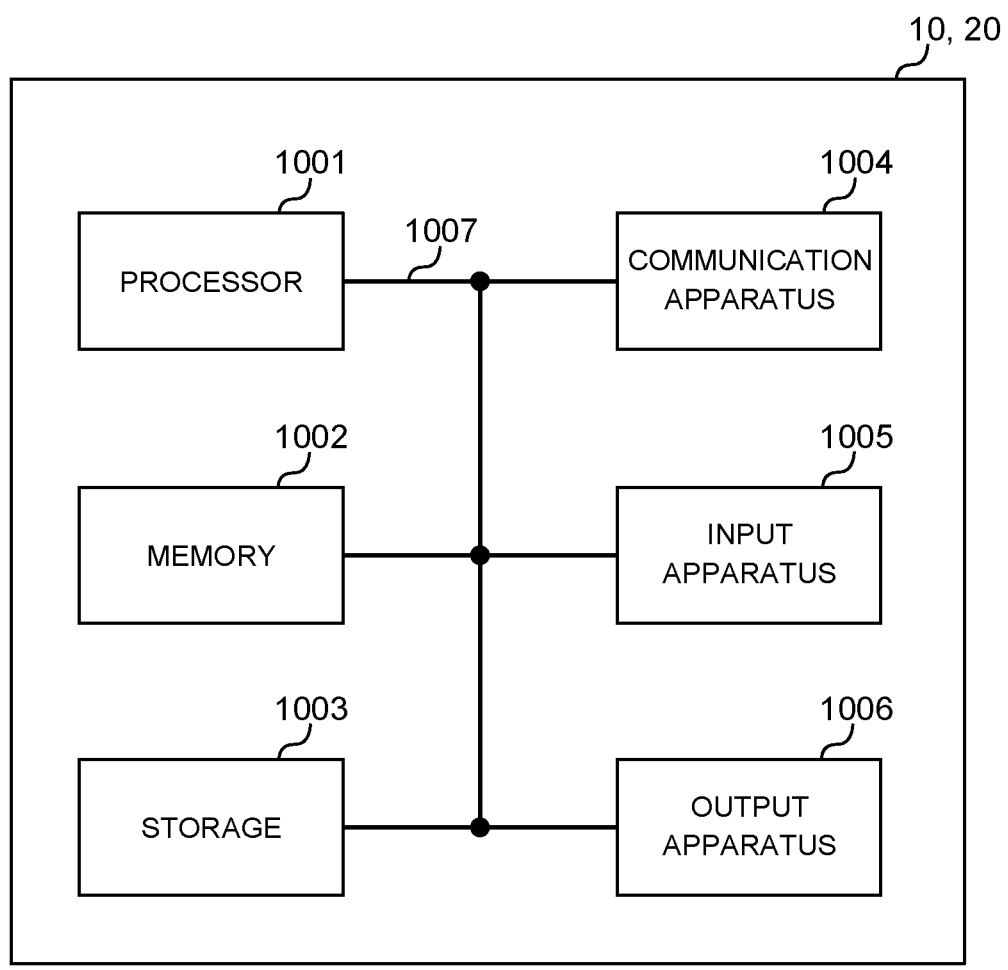
FIG. 18 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 18 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read given software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:

a processor that determines a set of downlink control channel candidates based on configuration information, the configuration information indicating a first combination, for a first downlink control information format, of a first aggregation level and a first number of downlink control channel candidates, and indicating a second combination, for a second downlink control information format, of a second aggregation level and a second number of downlink control channel candidates, wherein the configuration information indicates one control resource set associated with the set of downlink control channel candidates; and a receiver that monitors the set of downlink control channel candidates in the control resource set.

2. The terminal according to claim 1, wherein the first combination comprises a combination of each of a plurality of the first aggregation levels with a respective first number of downlink control channel candidates, and the second combination comprises a combination of at least one of the plurality of the first aggregation levels with the second number of downlink control channel candidates.

3. The terminal according to claim 1, wherein the second number of downlink control channel candidates corresponding to a specified aggregation level is different from the first number of downlink control channel candidates corresponding to the specified aggregation level.

4. The terminal according to claim 2, wherein the second number of downlink control channel candidates corresponding to a specified aggregation level is different from the first number of downlink control channel candidates corresponding to the specified aggregation level.

5. A radio communication method for a terminal comprising:

determining a set of downlink control channel candidates based on configuration information, the configuration information indicating a first combination, for a first downlink control information format, of a first aggregation level and a first number of downlink control channel candidates, and indicating a second combination, for a second downlink control information format, of a second aggregation level and a second number of downlink control channel candidates, wherein the configuration information indicates one control resource set associated with the set of downlink control channel candidates; and monitoring the set of downlink control channel candidates in the control resource set.

6. A system comprising a terminal and a base station, wherein:

the terminal comprises:

a processor that determines a set of downlink control channel candidates based on configuration information, the configuration information indicating a first combination, for a first downlink control information format, of a first aggregation level and a first number of downlink control channel candidates, and indicating a second combination, for a second downlink control information format, of a second aggregation level and a second number of downlink control channel candidates, wherein the configuration information indicates one control resource set associated with the set of downlink control channel candidates; and a receiver that monitors the set of downlink control channel candidates in the control resource set, and the base station comprises:

a transmitter that transmits the configuration information.

* * * * *